(12) United States Patent
Kimoto et al.

(10) Patent No.: US 7,874,104 B2
(45) Date of Patent: Jan. 25, 2011

(54) STRUCTURE OF WINDOW OPENING OF CAR DOOR

(75) Inventors: Tohru Kimoto, Tokyo (JP); Kenichi Sakanoue, Tokyo (JP)

(73) Assignee: Mitsubishi Jidosha Kogyo Kabushiki, Tokyo (JP)

( * ) Notice: Subject to any disclaimer, the term of this patent is extended or adjusted under 35 U.S.C. 154(b) by 0 days.

(21) Appl. No.: 11/990,089

(22) PCT Filed: Aug. 3, 2006

(86) PCT No.: PCT/JP2006/315782

§ 371 (c)(1), (2), (4) Date: Sep. 9, 2008

(87) PCT Pub. No.: WO2007/018253

PCT Pub. Date: Feb. 15, 2007

(65) Prior Publication Data

US 2009/0064594 A1 Mar. 12, 2009

(30) Foreign Application Priority Data

Aug. 8, 2005 (JP) ............................. 2005-229795

(51) Int. Cl.
*B60J 5/04* (2006.01)
(52) U.S. Cl. .................. 49/502; 296/146.5; 49/441
(58) Field of Classification Search ............ 49/502, 49/440, 441, 489.1, 495.1; 296/146.5
See application file for complete search history.

(56) References Cited

U.S. PATENT DOCUMENTS

| 4,649,668 | A | * | 3/1987 | Skillen et al. ............. 49/374 |
| 4,811,517 | A | * | 3/1989 | Eckert et al. ............. 49/145 |
| 5,139,307 | A | * | 8/1992 | Koops et al. ............ 296/201 |
| 5,317,835 | A | * | 6/1994 | Dupuy et al. ............ 49/441 |
| 5,566,510 | A | * | 10/1996 | Hollingshead et al. ...... 49/479.1 |
| 5,702,148 | A | * | 12/1997 | Vaughan et al. ......... 296/146.9 |
| 5,779,956 | A | * | 7/1998 | Hollingshead et al. ...... 264/138 |
| 5,846,463 | A | * | 12/1998 | Keeney et al. ............. 264/135 |
| 6,220,650 | B1 | * | 4/2001 | Davis et al. ........... 296/146.16 |
| 6,422,639 | B1 | * | 7/2002 | Hemauer ............... 296/146.5 |
| 6,817,651 | B2 | * | 11/2004 | Carvalho et al. ........ 296/146.2 |
| 7,234,756 | B2 | * | 6/2007 | Lynam et al. ........... 296/146.5 |

(Continued)

FOREIGN PATENT DOCUMENTS

JP 62-72212 A 5/1987

(Continued)

*Primary Examiner*—Jerry Redman
(74) *Attorney, Agent, or Firm*—Birch, Stewart, Kolasch & Birch, LLP

(57) ABSTRACT

According to the invention, a car door has a window opening defined by an upward part extending from a rear upper end of a door panel and a sash assembly; a stationary panel fitted in a rear window opening defined by the sash assembly and a center sash; a curved edge of the upward part defines a bottom of the window opening; and a weather strip including a part engaging a periphery of the stationary panel, attached to the periphery of the window opening, serving as a seal, and having an inner lip extending from an inner edge of the part engaging the periphery of the stationary panel and an outer lip extending toward and being in contact with an external part of the curved edge of the outer panel.

3 Claims, 8 Drawing Sheets

U.S. PATENT DOCUMENTS

| | | | |
|---|---|---|---|
| 2006/0103047 A1* | 5/2006 | Zwolinski | 264/174.11 |
| 2006/0123708 A1* | 6/2006 | Fuetterer et al. | 49/502 |
| 2006/0156632 A1* | 7/2006 | Ruppert et al. | 49/502 |
| 2007/0125004 A1* | 6/2007 | Conner et al. | 49/502 |
| 2009/0038232 A1* | 2/2009 | Kimoto | 49/502 |

FOREIGN PATENT DOCUMENTS

| | | | |
|---|---|---|---|
| JP | 04303018 A | * | 10/1992 |
| JP | 2000-203270 A | | 7/2000 |
| JP | 2003-220830 A | | 8/2003 |

* cited by examiner

STRUCTURE OF WINDOW OPENING OF CAR DOOR

FIELD OF THE INVENTION

The present invention relates to a structure of a window opening of a car door which is constituted by a panel body and a sash assembly at an upper end of the panel body.

BACKGROUND OF THE INVENTION

A car is provided with doors for passengers to get in and out of the car. Referring to FIG. 12, FIG. 13(a) and FIG. 13(b) of the accompanying drawings, a rear door 100 is constituted by a panel body 110 which includes an outer panel 111 and an inner panel 112, and a sash assembly 113. The sash assembly 113 includes not only a roof-facing sash 150 facing with a car roof but also a center sash 130, is placed above the panel body 110, and defines a window opening where a glass slide 200 and a stationary pane 120 are fitted.

The stationary pane 120 is positioned at a rear part of the window opening defined by the center sash 130 and the roof-facing sash 150. The glass slide 200 and stationary pane 120 are sealed by a weather strip 160.

A bottom of the stationary pane 120 is fitted into a main part 161 of the weather strip 160, and is engaged into a U-shaped frame 170 at top edges of the inner and outer panels 111 and 112. The main part 161 of the weather strip 160 has an inner lip 162 and an outer lip 163, which extend inward and outward of the car body. The outer lip 163 is in contact with a straight belt line outer molding 180, and refines an external appearance of the car. The inner lip 162 is in contact with a straight belt line inner molding 190, and assures a refined internal appearance of the car. A front end of the outer molding 180 is engaged with an upper edge of the outer panel 111, and faces with an outer surface of the glass slide 200. The inner molding 190 is engaged with an upper edge of the inner panel 112, and faces with an inner surface of the glass slide 200.

Japanese Patent Laid-Open Publication No. 2003-063255 describes a structure of a car window opening. In the publication, an outer panel and an inner panel have straight upper edges, and a stationary pane is fitted in a rear door opening. An outer lip extending outward from a weather strip is in contact with a belt line outer molding while an inner lip extending inward from the weather strip is in contact with an upward part of an inner trimming.

It is assumed here that a door includes a panel body, outer and inner panels, an upward part at an upper rear end of the panel body, and a stationary pane fitted in a window opening defined by a center sash and the upward part. A periphery of the stationary pane is curved like an example shown in FIG. 1. The foregoing door differs from a door shown in FIG. 12, and seems to suffer the following problems.

Not only a weather strip but also inner and outer moldings are attached to the curved periphery of the window opening, so that the outer and inner moldings overlap on the weather strip.

The inner and outer moldings should be three-dimensionally shaped in order to extend around the curved periphery, which is troublesome. Further, it is time consuming to align the inner and outer moldings on the weather strip. Further, the inner and outer moldings should be smoothly attached to a straight molding at a front part of the door in a streamlined state. Still further, connecting parts for the three-dimensionally shaped inner and outer moldings may have variable dimensions at their connecting parts. The three-dimensionally shaped inner and outer moldings are difficult to absorb dimensional differences of the connecting part when they are assembled. Attaching such moldings is time consuming, an assembling cost will be increased, and reliable quality may be difficult to be assured.

The present invention has been contemplated taking the foregoing problems into consideration, and is intended to provide a structure of a window opening which enables a weather strip for a stationary pane to serve as moldings, and to be easily attached.

SUMMARY OF THE INVENTION

In order to accomplish the foregoing object, there is provided a structure of a window opening for a car door, wherein the window opening is defined by an upward part extending from a rear upper end of a panel of the car door; a sash assembly is placed above a belt line of an essential part of the car door; a center sash is placed at a rear part of the window opening; a bottom of the window opening is defined by a curved edge of the upward part; a stationary panel is fitted in the rear part of the window opening; and a weather strip including a part engaging a periphery of the stationary panel is attached to the periphery of the window opening, serves as a seal, and has an inner lip extending from an inner edge of the part engaging the periphery of the stationary panel and an outer lip extending toward and being in contact with an external part of the curved edge of the outer panel.

According to the foregoing structure, at a part where the weather strip faces with the center sash, a shape of the outer lip of the weather strip matches with an external shape of a rear end of a belt line outer molding upstream of the center sash.

In the foregoing structure, at a part where the weather strip faces with the center sash, a shape of the outer lip of the weather strip matches with an external shape of a rear end of a belt line outer molding upstream of the center sash.

In accordance with the invention, the stationary panel is fitted into the rear part of the window opening near where the upward part is formed at the door panel. The stationary panel is attached via the weather strip which has both the inner and outer lips extending around the inner and outer peripheries as an integral unit, and serving as inner and outer braids. No additional braids are necessary at the periphery of the rear door opening. The stationary panel can be easily attached with a reduced cost, which is effective in improving the appearance of the rear door.

Further, the stationary panel can be easily attached in a streamlined manner without non-alignment with the belt line outer molding. This is effective in reducing the fabrication cost.

DETAILED DESCRIPTION OF THE INVENTION

Figure 5:
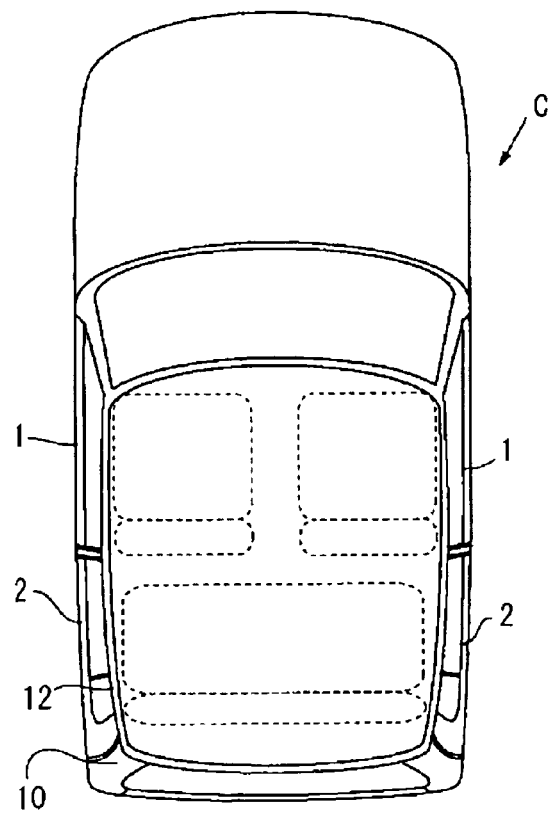
FIG. 5 is a schematic top plan view of a car.

A structure of a window opening (shown in FIG. 1) is applied to a car C shown in FIG. 5. The car C is provided with front right and left doors 1 and rear right and left doors 2, via which passengers to get in and get off. A front edge (shown at a lower left part in FIG. 1) of each rear door 2 is hinged to a front edge (not shown) of a rear door opening. Further, a rear edge of the rear door 2 is locked to and unlocked from a rear end pillar using a latch or a striker (not shown).

Figure 1:
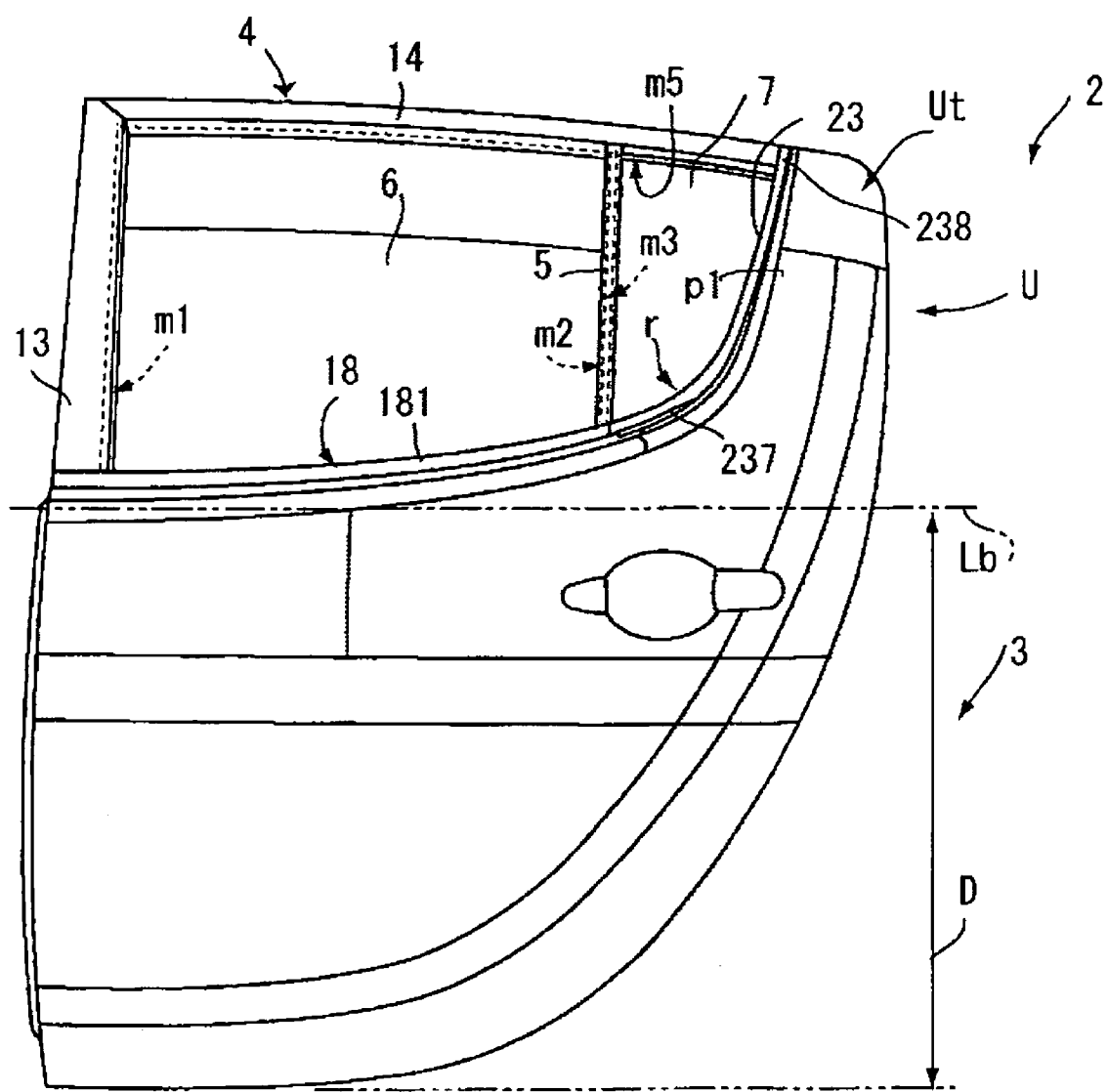
FIG. 1 is a front elevation of a rear door having a window opening structured according to a first embodiment of the invention.
Figure 3:
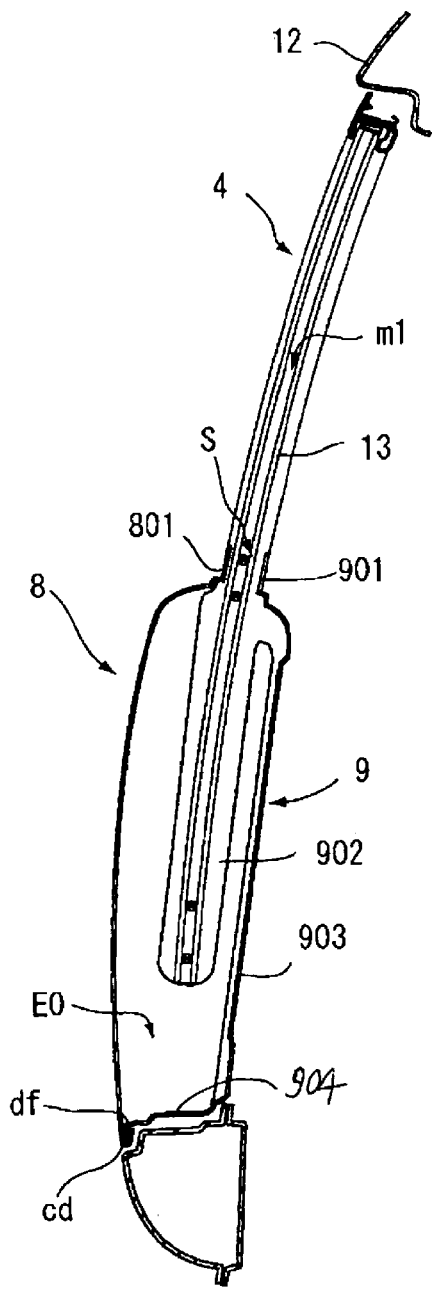
FIG. 3 is a schematic longitudinal section of an essential part of the rear door.

As shown in FIG. 1 and FIG. 3, each rear door 2 is constituted by a door panel 3; a bracket-shaped sash assembly 4 coupled to an upper part of the door panel 3; a center sash 5 extending between the bracket-shaped sash assembly 4 (called the sash assembly 4 hereinafter) and the door panel 3; a glass slide 6 which is movable in a window opening; a stationary glass pane 7 covering a rear part of the window opening; a door knob (not shown); and accessories attached to the rear door 2.

Referring to FIG. 3, the door panel 3 is constituted by outer and inner panels 8 and 9 which are joined and define a space E0. A door panel opening S is defined between upper edges 801 and 901 of the outer and inner panels 8 and 9. Further, a door lower-half D is present under a belt line Lb, and an upward part U extends from a rear part of the door lower-half D.

Figure 6:
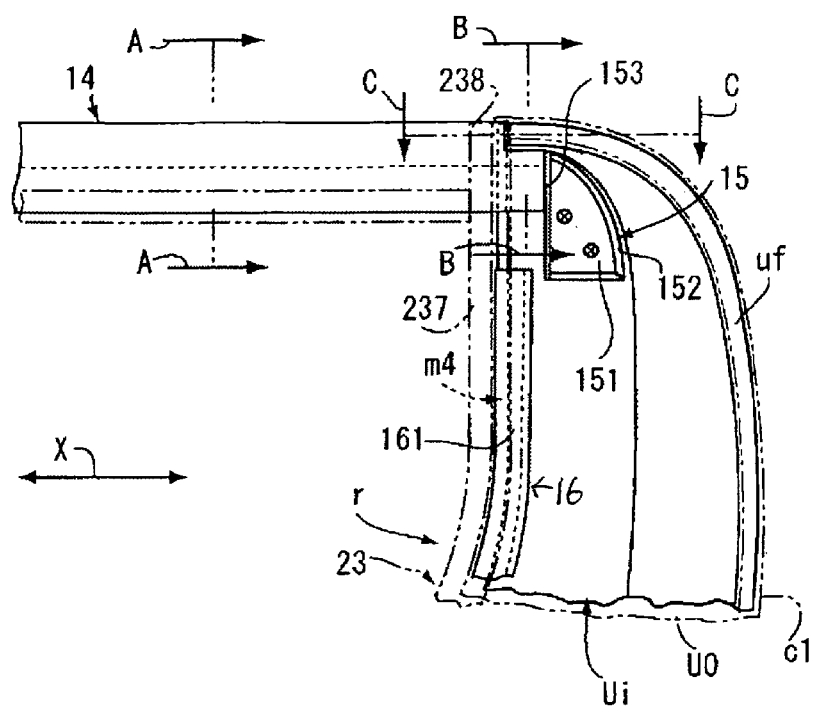
FIG. 6 shows how an upward part of the car is coupled to a sash facing with a roof.
Figure 9:
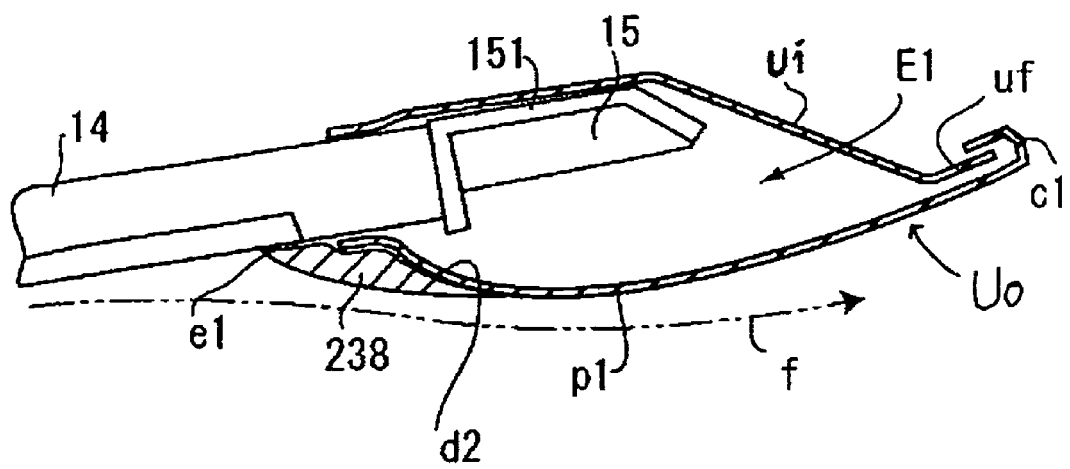
FIG. 9 is a cross section taken along line C-C in FIG. 6.

The rear door opening is defined by the sash assembly 4 above the belt line Lb, the center sash 5, and the upward part U. The sash assembly 4 includes a front longitudinal sash 13 and a roof-facing sash 14. As shown in FIG. 1 and FIG. 3, the front longitudinal sash 13 is in contact with a front periphery 902 of the inner panel 9, and is welded. A rear end of roof-facing sash 14 is welded to a sash bracket 15 (to be described later) in the upward part U as shown in FIG. 6 and FIG. 9.

The stationary pane 7 is fitted in the rear window opening. Further, a bottom and a side of the rear window opening are curved in accordance with the shape of the upward part U, serving as a curved periphery "r".

Referring to FIG. 3, the inner panel 9 is constituted by a main body 903; a periphery 904 which is bent at the front, rear and bottom parts and extends toward the outer panel 8; and a flange df extending outward from the periphery 902. The flange df is received in a part cd at the bottom of the outer panel 8, and is hemmed.

A top edge Ut of the upward part U faces with a roof side rail 12. Refer to FIG. 3 and FIG. 11(a) to FIG. 11(c).

As shown in FIG. 9, the upward part U is engaged with an upward extension Uo of the outer panel 8 (called the "outer upward extension Uo") and an upward extension Ui of the inner panel 9 (called the "inner upward extension Ui) via the space E1. A flange uf of the inner upward extension Ui is covered by a part cl of the outer upward extension Uo, and is hemmed. A sash bracket 15 is arranged at an upper end of the space E1, and includes a base 151 and a flange 152. The base 151 of the sash bracket 15 is welded to the inner upward extension Ui at a plurality of positions. Referring to FIG. 6, a rear end of the lateral sash 14 is in contact with an upper part of a front flange 153 of the sash bracket 15, and is welded, i.e., the rear end of the lateral sash 14 is engaged between the inner and outer and inner upward extensions Ui and Uo, and is joined to the inner upward extension Ui via the sash bracket 15.

Figure 7A:
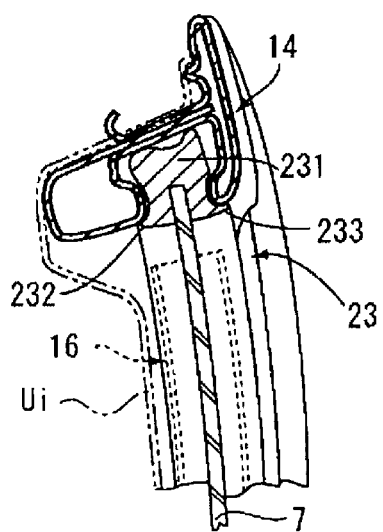
FIG. 7(a) is a cross section of an essential part taken along line A-A in FIG. 6.
Figure 7B:
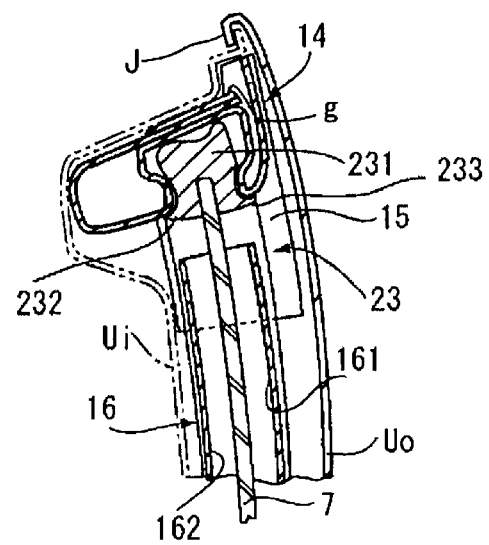
FIG. 7(b) is a cross section of the essential part taken along line B-B in FIG. 6.

Referring to FIG. 7(a) and FIG. 7(b), the roof-facing sash 14 faces with the inner upward extension Ui, and has a top "g" thereof cut. The inner upward extension Ui is placed on the top "g" of the lateral sash 14. A height of a position J where the inner and outer upward extensions Ui and Uo overlap is designed to be equal to a height of the roof-facing sash 14.

Figure 8:
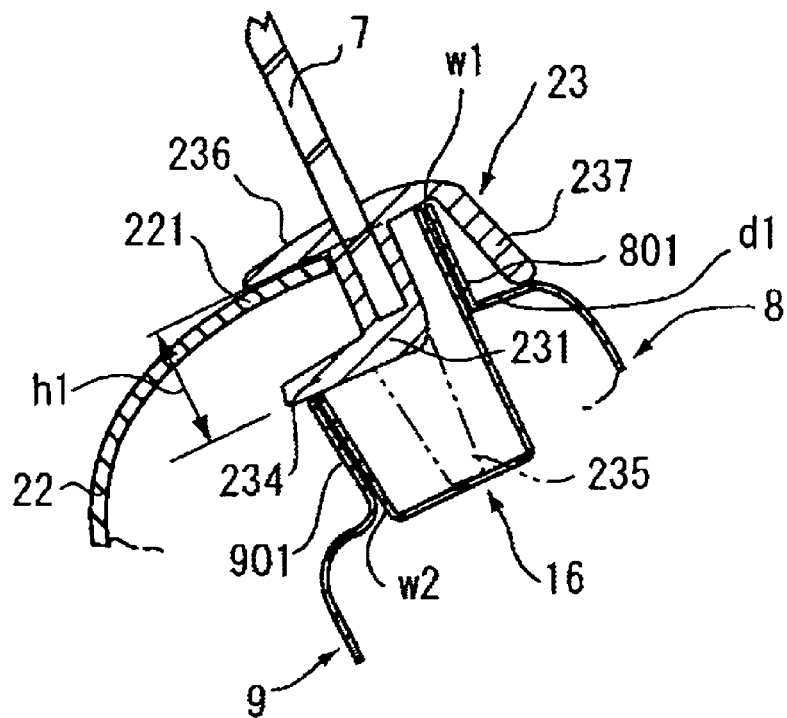
FIG. 8 is an enlarged cross section of a upward part of the rear door in FIG. 1.

A long glass receptacle 16 which is in the shape of deformed letter U is attached to the curved periphery "r" of the upward part U. As shown in FIG. 7(b) and FIG. 8, the glass receptacle 16 is constituted by an outer overlap w1 where an outer wall 161 of the car body is in contact with the periphery of the outer upward extension Uo, and an inner overlap w2 where an inner wall 162 is in contact with the inner upward extension Ui. The outer overlap w1 is higher by h1 than the inner overlap w2. The inner upward extension Ui is welded to the inner overlap w2 at a plurality of positions. Thereafter, the periphery of the outer upward extension Uo is brought into contact with the outer wall 161, to which the outer overlap w1 is welded. This welding process can be easily performed.

Referring to FIG. 9, a door wall defined by the outer upward extension Uo has a three-dimensionally curved surface which most expands at the front center "p1" (shown in FIG. 1), and gradually dwindles at upper and rear parts. The door wall is flush with the roof side rail 12 and the rear pillar 10.

Figure 10:
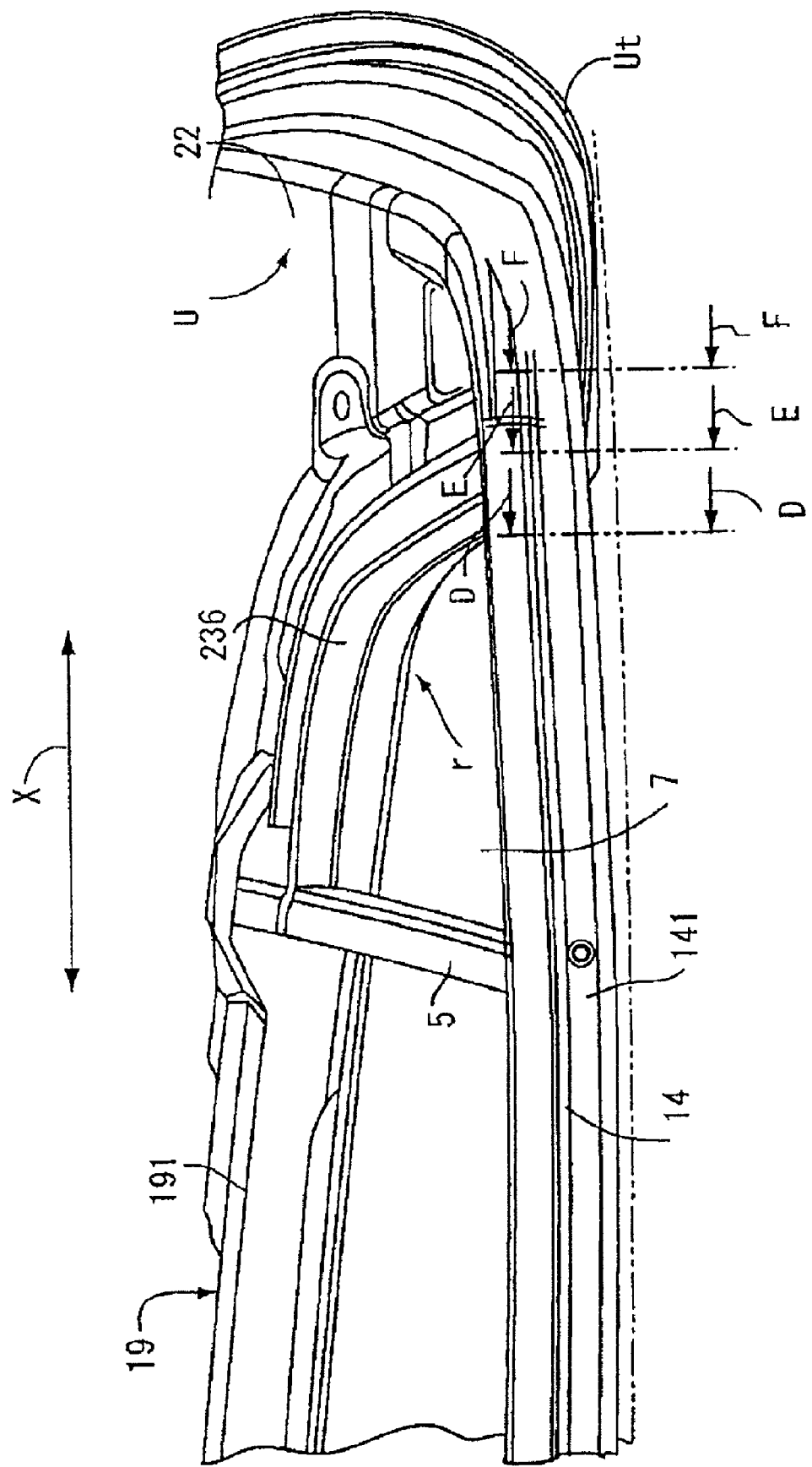
FIG. 10 is a perspective view of a part of the rear door, observed from obliquely upward.
Figure 11A:
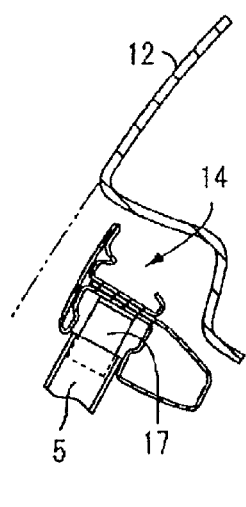
FIG. 11(a) is a cross section of the essential part taken along line D-D in FIG. 10.

A bend 141 is formed at an intermediate part of the roof-facing sash 14 extending in the direction X. The top of the center sash 5 is in contact with a lower edge of the bend 141. Refer to FIG. 10. The bend 141 and the center sash 5 are joined via a bracket 17 as shown in FIG. 11(a). The bottom of the center sash 5 is joined to an inner wall of the inner panel 9 via a sash bracket (not shown).

The center sash 5 is in the shape of H, and is parallel to the front longitudinal sash 13. The glass slide 6 is movably fitted in a groove m1 of the front longitudinal sash 13 and a front groove m2 of the center sash 558 via a glass holding channel (not shown). The glass slide 6 is provided with a glass support at its bottom, and is movable up and down when the glass support is activated by a window regulator (not shown) attached to the inner panel 9.

Figure 4:
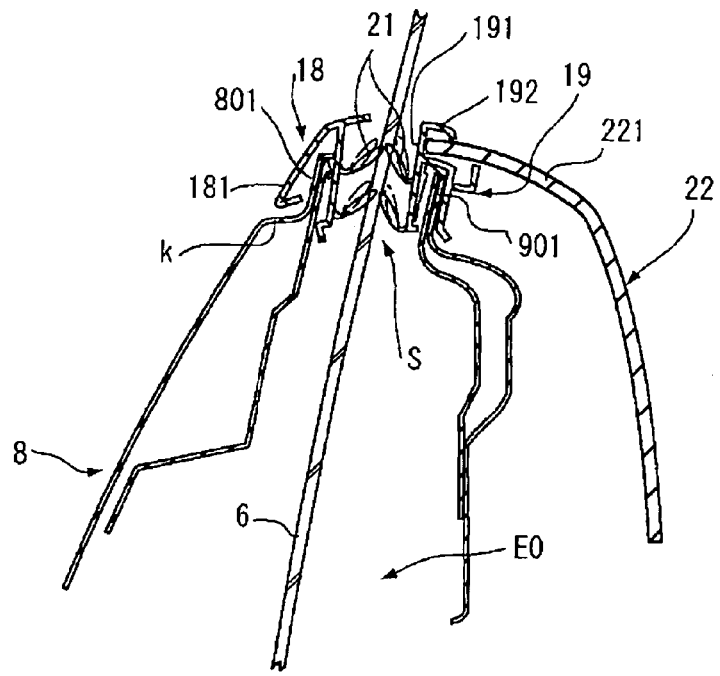
FIG. 4 is a partly enlarged cross section of the essential part of the rear door.

Referring to FIG. 4, the bottom edge of the front window opening upstream of the center sash 5 is constituted by upper long edges 801 and 901 of the outer and inner panels 8 and 9. Belt line outer and inner moldings 18 and 19 are straight and in the shape of inverted letter U, and are irremovably attached to the bottom edge of the front window opening using claws (not shown).

The belt line outer and inner moldings 18 and 19 include draining channels 21 at positions where they face with the glass slide 6. The draining channels 21 prevent infiltration of water, dust and so on from an external source. An external cover 181 of the belt line outer molding 18 has its bottom brought into contact with a step "k" at the belt line Lb position of the outer panel 8, which is effective improving the external appearance of the upper long edge 801. A bend 192 is made toward the car interior from the top of a base 191 (in the shape of the inverted U) of the belt line inner molding 19. A tip of an upper bend 221 of a door trimming 22 is fitted between the bend 192 and the top of the base 191 to a predetermined extent, which is effective in improving the external appearance of a coupling structure for the inner panel 9 and the upper bend 221 of the door trimming 22.

The stationary glass pane 7 is fitted into the front groove m3 of the center sash 558, upper groove m5 of the lateral sash 14, and curved groove m4 at the curved peripheral edge "r" of the glass receptacle 16. The outer edge of the stationary pane 7 is sealed by the weather strip 23 (shown in FIG. 2 and FIG. 8).

Figure 2:
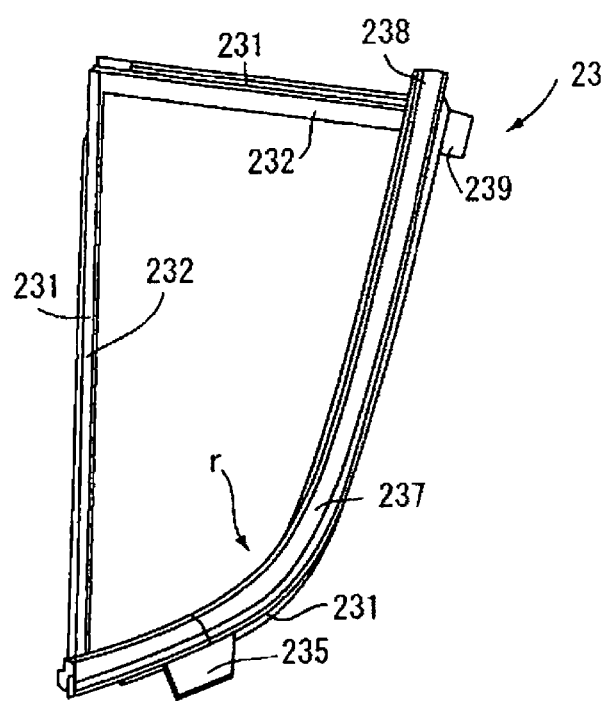
FIG. 2 is an enlarged top plan view of a weather strip attached to the rear door shown in FIG. 1.

The weather strip 23 is approximately in the shape of a loop as shown in FIG. 2, and has a cross-section as shown in FIG. 7(a) or FIG. 7(b) at the rear groove m3 of the center sash 5, and at the upper groove m5 of the lateral sash 14. Specifically, the weather strip 23 is provided with a part 231 to be engaged with the edge of the stationary pane 7, and internal and outer lips 232 and 233 extending from the part 231.

As shown in FIG. 8, at a part facing with the curved peripheral edge "r", a longitudinal section of the weather strip 231 is defined by the following components: a flange 234 which extends from the part 231 (engaged with the stationary window pane 7) toward the interior of the car C and is in contact with the inner part w2; a base 235 extending from the bottom of the part 231; an inner lip 236 extending from the top of the part 231 toward the interior of the car; an outer lip 237 extending from the top of the part 231 toward the exterior of the car; a part 238 at the top of the peripheral edge "r"; and a lip 239 extending from the part 231 above the peripheral edge "r" toward the exterior and being in the shape of a fin. The lip 239 prevents invasion of liquids.

Figure 11B:
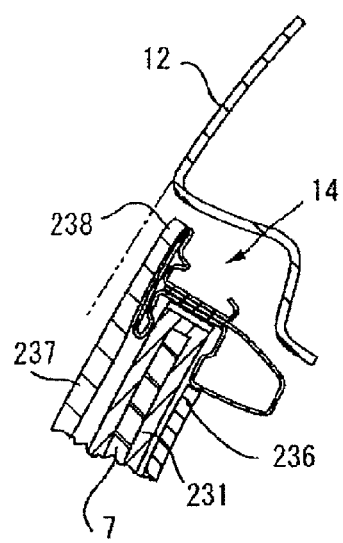
FIG. 11(b) is a cross section of the essential part taken along line E-E in FIG. 10.
Figure 11C:
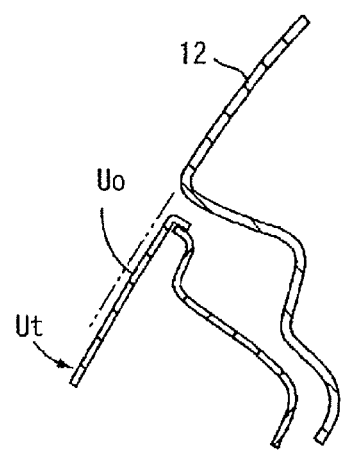
FIG. 11(c) is a cross section of the essential part taken along line F-F in FIG. 10.
Figure 12:
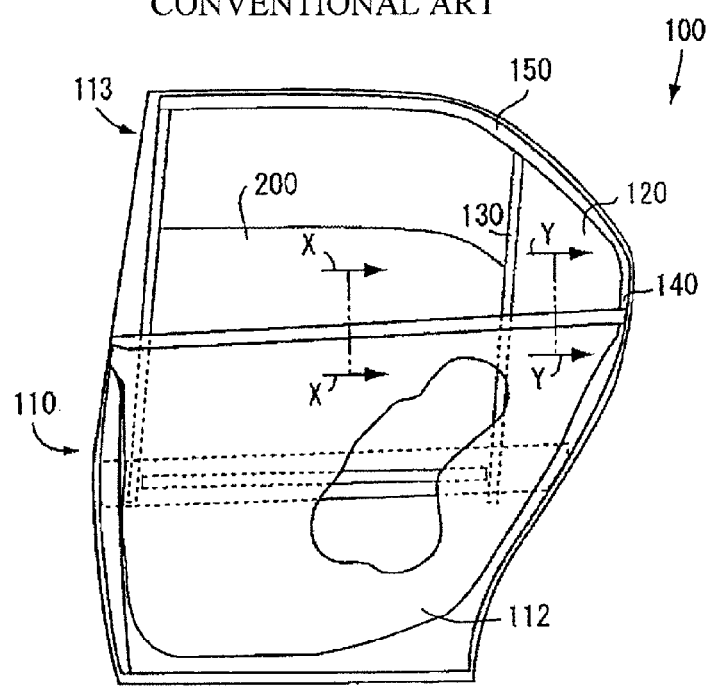
FIG. 12 is an elevation of a car of the related art, showing an interior or a rear door.
Figure 13A:
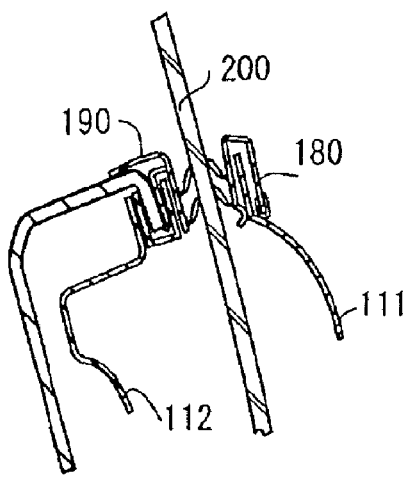
FIG. 13(a) is a cross section of the rear door of FIG. 12, taken along line X-X in FIG. 12.
Figure 13B:
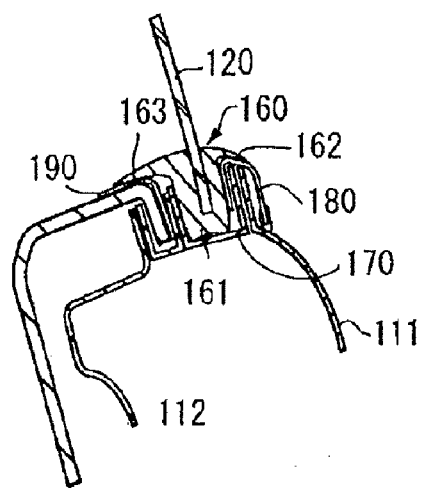
FIG. 13(b) is a cross section of the rear door of FIG. 12, taken along line Y-Y in FIG. 12.

The part 231 is shaped to hold substantially the whole area of the peripheral edge of the stationary pane 7, but is not present at the part 238. Referring to FIG. 9 and FIG. 11(b), the part 238 is shaped as if the outer lip 237 is flattened and thickened. The thickened part 238 overlaps with the rear edge of the lateral sash 14 and the upper edge of the outer upward extension Uo, is joined to these parts, and faces with the roof side rail 12.

Referring to FIG. 9, a front edge e1 of the part 238 is contacted to the rear end of the roof-facing sash 14. The part 238 is gradually thickened toward the step d2 at the upper end of the outer upward extension Uo. When being in contact with the step d2, the part 238 is designed to be substantially flush with the upper edge of the outer upward extension Uo. The upper edge of the outer upward extension Uo is also substantially flush with the surface of the rear pillar 10. The part 238 is effective in diverting turbulent airflow "f" at the step d2, and suppressing wind noise.

The base 235 extending from the bottom of the part 231 is in the shape of a thick block, and is relatively rigid. The base 235 is fitted into the curved groove m4, and prevents the part 231 from laterally moving. Further, since the lower flange 234 is in contact with the inner part w2, the part 231 can hold the stationary pane 7 at the predetermined position.

The outer lip 237 extends outward from the part 231 along the curved periphery "r" of the rear window opening where the weather strip 23 faces. As shown in FIG. 8, the outer lip 237 is shaped to cover the upper edge 801 of the outer panel 8 at the curved periphery "r" of the window opening, and to extend downward to come into contact with the step d1 of the outer panel 8.

At a part where the weather strip 23 faces with the center sash 5, the outer lip 237 is shaped to have the same external appearance of an outer cover 181 of the belt line outer molding 18. In other words, the belt line outer molding 18 and the outer lip 237 of the weather strip 23 match with each other near the belt line Lb, which is effective in enabling the car to have a refined external appearance.

Further, the inner lip 236 of the weather strip 23 extends from the part 231 to the interior of the car, and is shaped similarly to the bend 192 of the belt line inner molding 19. Both the outer lip 237 and the bend 192 have the same external appearance, so that they smoothly match with the inner lip 236. This is effective in improving the external appearance of the car.

Usually, the belt line outer and inner moldings 18 and 19 are curved in a complicated manner downstream of the center sash 5. This means that making and assembling of the foregoing moldings are very time consuming. With the rear door 1 shown in FIG. 1, the upward part U, and bottom and rear edges of the rear door opening are shaped to have the curved periphery "r". With the rear door 2 (shown in FIG. 1), the inner lip 236 of the weather strip 23 extends from the part 231, and is shaped to have the same appearance as that of the bend 192 of the belt line inner molding 19. Therefore, it is possible to make the inner lip 236 shaped similarly to the bend 192 at the weather strip 23 without using any additional parts.

As stated above, the outer lip 237 of the weather strip 23 is shaped similarly to the outer cover 181 of the belt line outer molding 18. Therefore, the outer lip 237 matches with the outer cover 181 without using an additional component. In short, the weather strip 23 includes the inner and outer lips 236 and 237 as integral parts. No positioning process is required for the inner and outer lips 236 and 237, which is effective in reducing an assembling cost. The inner and outer lips 236 and 237 (extending along the curved periphery "r") are shaped as if they are integral to the bend 192 and the outer cover 181. Usually, three parts, or the weather strip, and inner and outer lips, are separately prepared. With the present invention, only one component is required. The weather strip 23 can be smoothly and easily placed on the outer cover 181 of the belt line outer molding 18 without any positioning process. This is effective in facilitating an assembling work, reducing an assembling cost, preventing misalignment, and maintaining the quality of the product.

In the foregoing description, the stationary pane is used. Alternatively, a plastic panel may be used. When the plastic panel is used, the car door is as effective and advantageous as the car door with the stationary pane shown in FIG. 1. Further, the invention is effectively applicable to a car having two doors as well as the car having four doors.

INDUSTRIAL APPLICABILITY

The structure of the window opening for the car door of the present invention is applicable to a car in which a rear window opening is sectioned by a center sash, and in which a weather strip is used to attach a stationary pane for covering the rear window opening to a periphery of the rear glass opening.

What is claimed is:

1. A structure of a window opening for a car door which comprises:
    a door panel including an outer panel and an inner panel lapped each other and integrally formed;

an upward part upwardly extending from a rear upper end of the door panel; and a bracket-shaped sash assembly including a vertical sash standing at an upper front end of the door panel and a roof-facing sash horizontally extending from the vertical sash and joined to an upper end of the upward part;

wherein the window opening is defined by the bracket-shaped sash assembly and the upward part, and is divided by a center sash into a front opening part and a rear opening part;

the rear opening part is fitted with a stationary panel, and has a peripheral edge curved upwardly and an external shape matching with an external shape of the front opening part;

a weather strip has a part engaged with the stationary panel along the peripheral edge of rear opening part, and seals the peripheral edge curved upwardly of the rear opening part;

an inner lip extends from an inner edge of the weather strip engaged to a periphery of the stationary panel, and an outer lip extends from an outer edge of the weather strip and is in contact with an external part of a curved edge of the outer panel; and an external shape of the outer lip matches with an external shape of a rear end of a belt line outer molding upstream of the center sash.

2. The structure according to claim 1, wherein at a part where the weather strip faces with the center sash, a shape of the outer lip of the weather strip matches with an external shape of a rear end of a belt line outer molding upstream of the center sash.

3. The structure according to claim 1, wherein at a part where the weather strip faces with the center sash, a shape of the inner lip of the weather strip matches with an external shape of a rear end of a belt line inner molding upstream of the center sash.

* * * * *